T. J. McCAFFREY.
TIRE.
APPLICATION FILED AUG. 17, 1920.
1,354,984.
Patented Oct. 5, 1920.
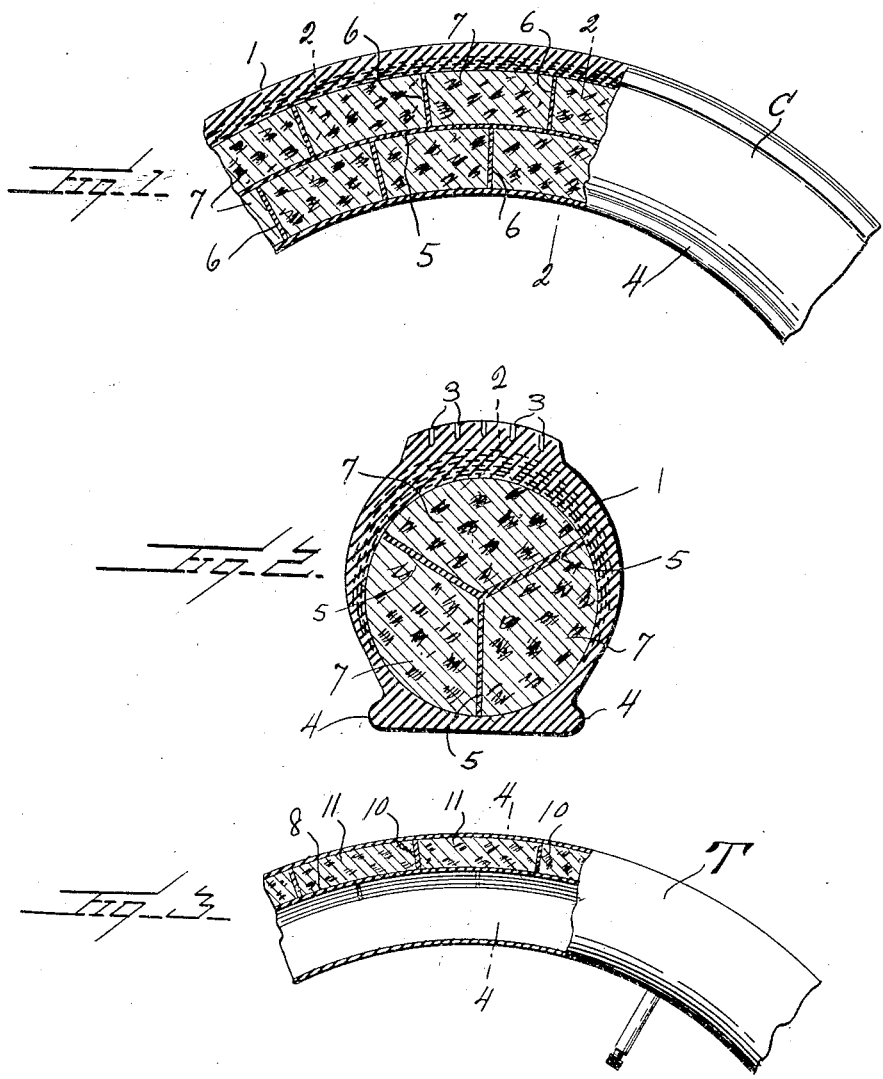
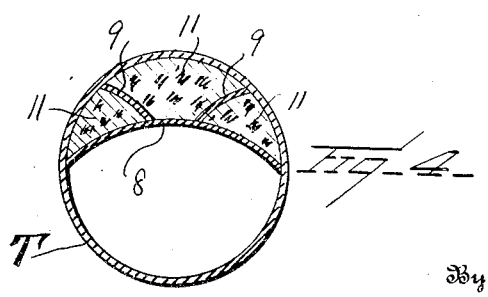
Inventor
T. J. McCaffrey
By Watson E. Coleman
Attorney

UNITED STATES PATENT OFFICE.

THOMAS J. McCAFFREY, OF SEATTLE, WASHINGTON.

TIRE.

1,354,984.     Specification of Letters Patent.     Patented Oct. 5, 1920.

Application filed August 17, 1920. Serial No. 404,185.

*To all whom it may concern:*

Be it known that I, THOMAS J. McCAFFREY, a citizen of the United States, residing at Seattle, in the county of King and State of Washington, have invented certain new and useful Improvements in Tires, of which the following is a specification, reference being had to the accompanying drawings.

This invention relates to certain improvements in tires and has relation more particularly to a structure embodying inclosed cores, and it is an object of the invention to provide a novel and improved arrangement wherein a plurality of cores are employed with each of said cores being confined within a separate or individual cell.

Another object of the invention is to provide a novel and improved device of this general character including an inclosed core consisting of a plurality of separated units, together with means for confining each of the units within an individual cell or chamber and in a manner whereby the wear upon the tire is prevented from affecting the efficiency of the core.

An additional object of the invention is to provide a novel and improved device of this general character comprising an inclosed core consisting of separated units or sections, each of said units or sections being of cork or other fibrous material, together with means to prevent the wear upon the tire causing the units of the core to become mushy, so that the tire will not become flabby or otherwise interfere with its elastic quality.

The invention consists in the details of construction and in the combination and arrangement of the several parts of my improved tire whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view partly in side elevation and partly in section of a tire constructed in accordance with an embodiment of my invention.

Fig. 2 is an enlarged sectional view taken substantially on the line 2—2 of Fig. 1.

Fig. 3 is a fragmentary view partly in side elevation and partly in section illustrating a further embodiment of my invention and Fig. 4 is an enlarged sectional view taken substantially on the line 4—4 of Fig. 3.

In the embodiment of my invention disclosed in Figs. 1 and 2 of the accompanying drawings, C denotes the carcass of the tire, preferably comprising laminations 1 of rubber and laminations 2 of cotton or linen cording. The tread portion of the carcass C is provided with the circumferentially disposed grooves 3 to facilitate the requisite gripping of the tire on the surface over which it travels and particularly to prevent skidding. It is to be understood, however, that I do not wish to be understood as limiting myself to these grooves or channels 3 as other arrangements may be employed with equal advantage.

The inner portion of the carcass C is provided with the laterally disposed and circumferentially extending beads 4 to provide means whereby the tire may be clamped in applied position to the rim of a wheel.

Extending circumferentially within the carcass C and radiating from substantially the center of the interior of said carcass are the partitions 5 of rubber, said partitions 5 being preferably three in number and equidistantly spaced. Each of the chambers between adjacent partitions 5 is intersected by the circumferentially spaced partitions 6 of rubber whereby a plurality of cells are provided and it is preferred that the cells of each of said chambers be staggered with respect to the cells of the remaining two chambers. Each of the cells is filled with a core unit 7 preferably of fibrous material and preferably cork.

In building the tire, the carcass C, together with the partitions 5 and 6, are properly arranged about the core units 7 and whereupon such assembled structure is vulcanized, preferably by steam heat.

By having the partitions 5 and 6 of proper thickness, the finished structure results in a tire possessing a lasting firmness and which prevents the steady wear upon the tire making the cork units mushy, so that the completed tire does not become flabby or the elastic quality thereof otherwise affected.

As illustrated in Figs. 3 and 4, I disclose a structure particularly adapted for use as an inner tube and wherein the tread portion of the tube T is provided with a circumferentially disposed partition 8 of rubber arranged within the tube T and spaced from the tread portion of the tube T proper. The chamber afforded by the partition 8 is divided into supplemental chambers by the circumferentially disposed rubber partitions 9 converging from the transverse central portion of the partition 8 and bridging the space between said partition 8 and the tread portion of the tire T. Each of the supplemental compartments is divided circumferentially into a plurality of cells by the rubber partitions 10 and each of said cells has snugly fitting therein a core unit 11 preferably of fibrous material and particularly cork. The internal core arranged within the tube T operates to prevent tacks, glass or other sharp or pointed obstructions from penetrating the tube T so that the life of said tube is materially increased.

From the foregoing description it is thought to be obvious that a tire constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A device of the character described comprising a carcass, circumferentially disposed partitions arranged within the carcass dividing the interior of the carcass into a plurality of circumferentially directed chambers, circumferentially spaced partitions intersecting each of said chambers and dividing the same into a plurality of cells, and a core unit snugly filling each cell.

2. A device of the character described comprising a carcass, circumferentially disposed partitions arranged within the carcass dividing the interior of the carcass into a plurality of circumferentially directed chambers, circumferentially spaced partitions intersecting each of said chambers and dividing the same into a plurality of cells, and a core unit snugly filling each cell, the cells of one chamber being staggered with respect to the cells of the adjacent chamber.

3. A device of the character described comprising a carcass, circumferentially disposed partitions arranged within the carcass dividing the interior of the carcass into a plurality of circumferentially directed chambers, circumferentially spaced partitions intersecting each of said chambers and dividing the same into a plurality of cells, and a fibrous core unit snugly filling each cell.

In testimony whereof I hereunto affix my signature.

THOMAS J. McCAFFREY.